United States Patent [19]

Chong

[11] 3,996,031
[45] Dec. 7, 1976

[54] FRACTIONATION OF MULTICOMPONENT DIMETHYLNAPHTHELENES FEEDS BY SELECTIVE CRYSTALLIZATION

[75] Inventor: Victor M. Chong, Media, Pa.

[73] Assignee: Sun Ventures, Inc., St. Davids, Pa.

[22] Filed: Aug. 8, 1974

[21] Appl. No.: 495,752

Related U.S. Application Data

[63] Continuation-in-part of Ser. No. 298,902, Oct. 18, 1972, abandoned.

[52] U.S. Cl. .................... 260/674 A; 23/296; 23/273 F; 260/674 R; 260/674 N; 62/538; 62/542

[51] Int. Cl.² .................... B01D 9/02; C07C 7/14

[58] Field of Search ................ 23/295, 273 F, 296; 62/58; 260/674 R, 674 N

[56] References Cited
UNITED STATES PATENTS

| | | | |
|---|---|---|---|
| 2,620,263 | 12/1952 | Macklin | 23/273 MT |
| 2,747,973 | 5/1956 | Hinrichs | 23/273 MT |
| 3,261,170 | 7/1966 | McCarthy | 23/273 F |
| 3,305,320 | 2/1967 | Waech | 23/305 |
| 3,392,539 | 7/1968 | Grimmett | 23/273 F |
| 3,501,275 | 3/1970 | Sailer | 23/273 F |
| 3,694,167 | 9/1972 | Gaillard | 23/273 MT |

Primary Examiner—Stephen J. Emery
Attorney, Agent, or Firm—J. Edward Hess; Donald R. Johnson; Paul Lipsitz

[57] ABSTRACT

A process and system for separating a preferentially crystallizable component A from a feed, wherein a series of zones are used between which mother liquor can flow without passage of crystallized material. Liquid feed is introduced to a zone other than the end zone from which effluent rich in component A is withdrawn. During one stage gradating crystallization temperature pattern is established throughout the series ranging from relatively low to relatively high, causing component A to crystallize in each zone; and mother liquor is caused to flow toward the low temperature end, while a portion of previously withdrawn effluent rich in component A is returned to the higher temperature end and effluent lean in component A is removed from the lower temperature end. In another stage a higher temperature pattern is established throughout the series whereby at least a portion of crystallized material melts in each zone, and mother liquor is caused to flow in the opposite direction while an equivalent amount of effluent rich in component A is withdrawn from said end zone.

8 Claims, 3 Drawing Figures

FIG. 2
FIG. 3
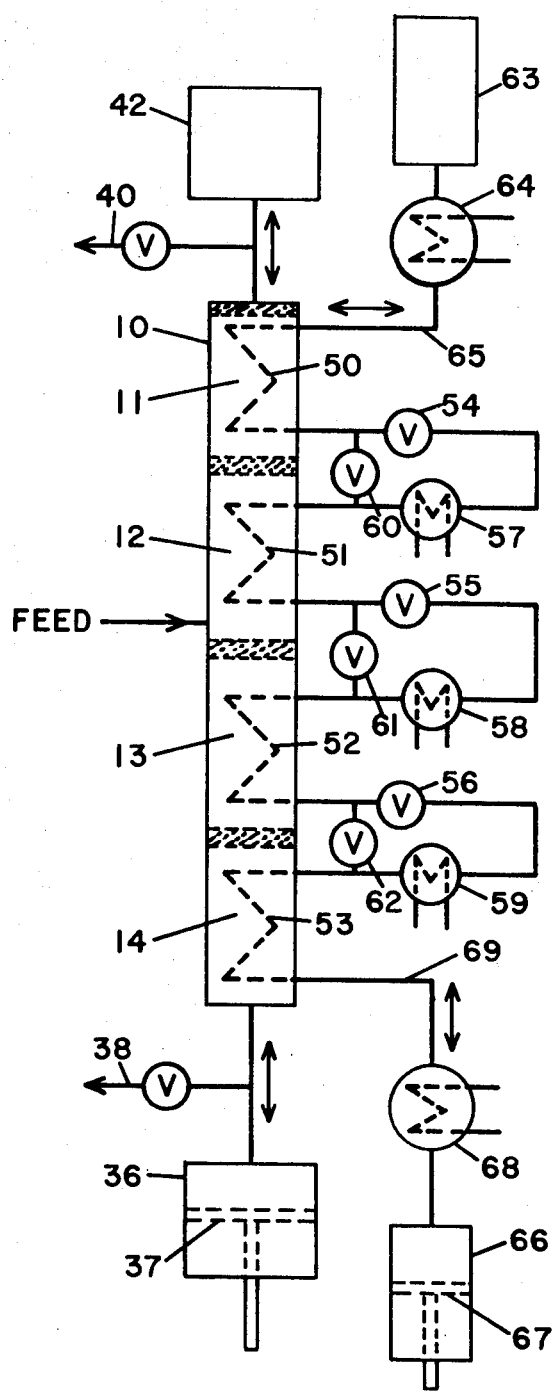
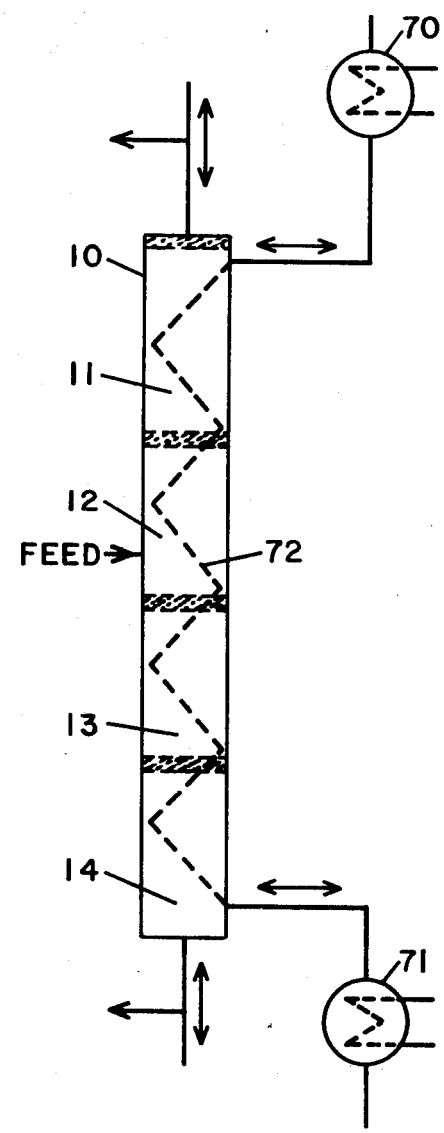

FRACTIONATION OF MULTICOMPONENT DIMETHYLNAPHTHELENES FEEDS BY SELECTIVE CRYSTALLIZATION

CROSS REFERENCE TO RELATED APPLICATION

This application is a continuation-in-part of Ser. No. 298,902, filed Oct. 18, 1972, now abandoned.

BACKGROUND OF THE INVENTION

This invention relates to a process and system for fractionating a multicomponent liquid feed mixture by utilizing selective crystallization and melting alternately in a system having a series of zones.

As a means of separation crystallizaion theoretically offers the advantage over other procedures such as distillation and extraction of yielding a pure component in a single stage. In practice, however, it generally is not possible to obtain a component pure by a single crystallization due to the occlusion of mother liquor by the crystal phase. Many crystallizaion procedures have been proposed heretofore to overcome the problem of occlusion and yield higher purity products. The following United States patents are examples of such procedures wherein the feed material flows through a crystalizing-melting system from which liquid product can be withdrawn:

| 2,910,516 | E.E. Rush    | October | 27, 1959 |
| 3,092,673 | E.E. Rush    | June    | 4, 1963  |
| 3,174,832 | B.B. Bohrer  | March   | 23, 1965 |
| 3,305,320 | M.E. Weech   | Feb.    | 21, 1967 |

The present invention provides a novel procedure for obtaining a purified component from a multicomponent mixture, which utilizes alternate crystallization and melting stages in a system having a plurality of fractionating zones. The procedure is somewhat like but not strictly analogous to that known as "parametric pumping" which has been applied to separations employing a solid adsorbent such as silica gel. The parametric pumping principle has been described, for example, by N. H. Sweed and R. H. Wilhelm in IND. ENG. CHEM. FUNDAMENTALS, Vol. 8, No. 2, 221–231 (1969), and references cited therein. In parametric pumping operations an equilibrium function relating the compositions of the two phases (adsorbed and non-adsorbed) is required, but in the present procedure a precisely analogous equilibrium function does not obtain since in theory (without conern for occlusion) the preferentially crystallized component phase would have the same composition regardless of the liquid phase composition.

SUMMARY OF THE INVENTION

The process of the present invention operates in a cyclic manner to separate and purify a preferentially crystallizable component A from a liquid feed mixture. The process is carried out in a fractionating system having (1) one end B from which component A is removed in liquid phase and another end C from which lower melting component material is removed in liquid phase, (2) a series of crystallization zones between ends B and C and (3) means for preventing passage of crystallized material between zones. The process consists essentially of:

a. feeding the feed mixture into the system at a zone removed from end B;

b. establishing a crystallization temperature pattern varying from temperature D at end C to temperature E at end B, temperature D being a relatively low temperature at which component A will crystallize from a mixture lean in component A, temperature E being a relatively high temperature at which component A will crystallize from a mixture rich in component A, whereby crystallization of component A from mother liquor occurs in all zones in the series;

c. following mother liquor through the series in a direction from end B to end C while preventing transfer of crystallized material between zones and while maintaining said crystallization temperature pattern, and simultaneously introducing into end B effluent rich in component A previously withdrawn from end B while removing from end C effluent lean in component A;

d. establishing a second temperature pattern along the series wherein the temperature is sufficiently high to melt in each zone at least a portion of component A crystals previously formed therein;

e. flowing mother liquor in a direction from end C to end B while maintaining said second temperature pattern, and simultaneously withdrawing from end B effluent rich in component A in amount equivalent to the mother liquor flow;

f. and separately removing effluents from each end of the fractionating system.

BRIEF DESCRIPTION OF THE DRAWINGS

The invention is described in conjunction with the accompanying drawings wherein:

FIG. 2 is a schematic illustration of a variation of the system wherein heat transfer means for the four zones are connected in series and include elements between zones; and FIG. 3 is another schematic illustration of a fractionating system wherein the means for regulating temperature of the heat transfer medium are located only at opposite ends of the series of zones.

DESCRIPTION

Figure 1:
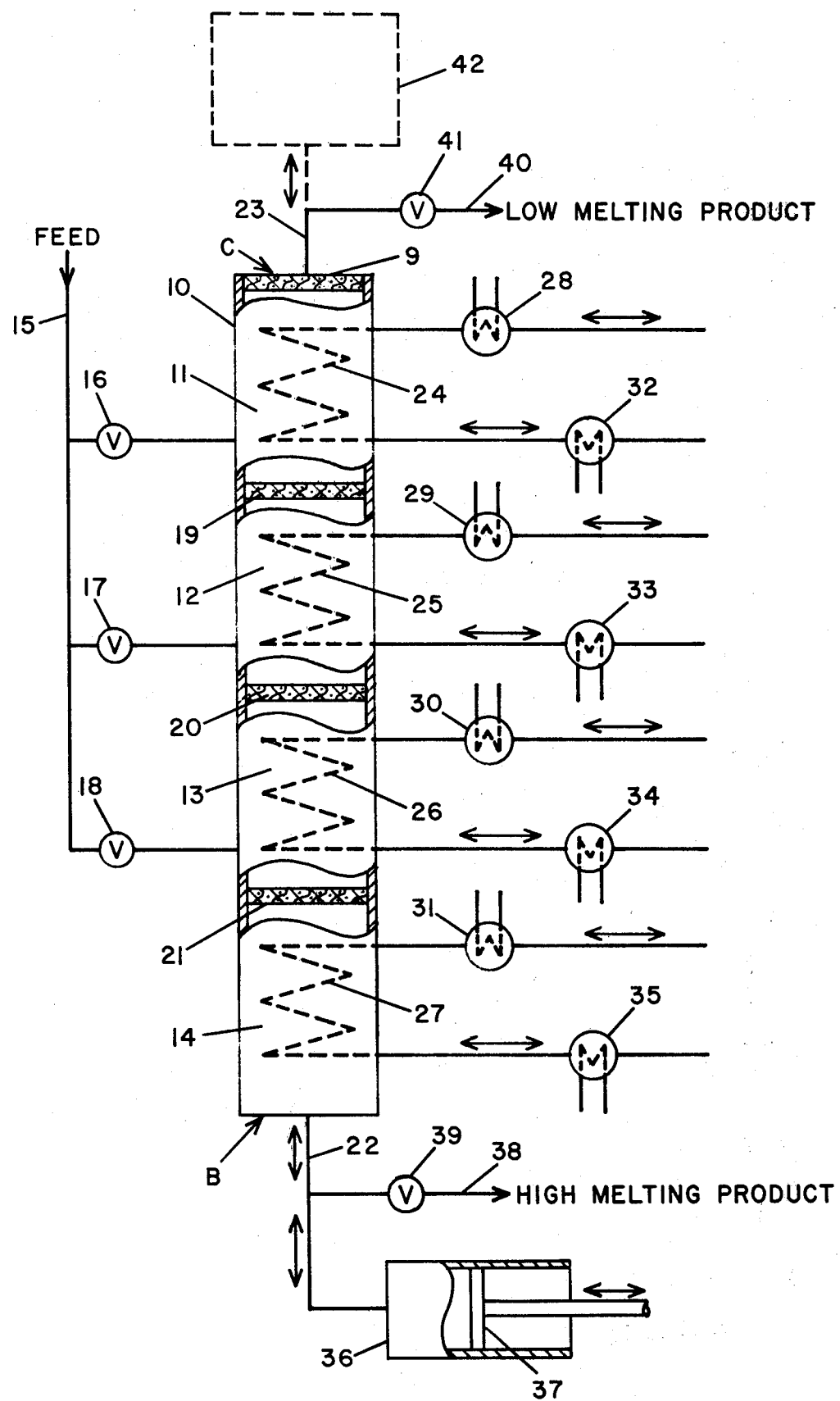
FIG. 1 is a diagrammatic, partly broken away illustration of one embodiment of a fractionating system for carrying out the process having independent heat transfer means for each of four crystallization-melting zones.

The invention can be utilized for obtaining in relatively pure form a component (herein generically identified as A) from any liquid mixture of components from which such component is preferentially crystallizable. It is particularly useful for fractionating organic mixtures, for example, for obtaining purified p-xylene from a mixture of xylenes or purified 2,6-dimenthyl-naphthalene from a mixture of dimethylnapthalenes.

With reference now to FIG. 1, an embodiment of the invention is illustrated wherein a column 10 is utilized to provide four fractionating zones, designated as 11, 12, 13 and 14. The liquid feed mixture is sent to the column through line 15 and can enter same at any zone other than zone 14. In other words the feed can pass through valve 16 into the uppermost zone 11, or through valve 17 into zone 12 or valve 18 into zone 13. The zones are separated from each other by foraminous elements or filters, designated as 19, 20 and 21, which allow the flow of mother liquor from zone to zone while preventing passage of crystallized material between zones, and another filter 9 is provided at the top.

As illustrated in FIG. 1, the lower end of the column, which is designated end B, is connected with outlet line 22 for the high melting effluent material and the opposite end C connects with outlet line 23 for low melting effluent material. It is not essential, however, that the high melting product issue from the column at the bottom. Thus the flow arrangement could, if desired, be reversed so that the lower and higher melting products would pass, respectively, from the bottom and top of the column. The system could also be varied by placing the column in a horizontal or inclined position.

While the system as shown in FIG. 1 contains four zones 11, 12, 13 and 14, the process of the invention can be practiced with any plural number of fractionating zones, for example, from two to ten zones. Each zone can be provided with means (not shown) such as stirrers or baffles for preventing channeling of feed component material and keeping the liquid phase more or less uniform throughout the zone.

Each zone in the series is provided with means for cooling or heating the feed component materials therein to establish the desired temperature pattern in the series and cause either selective crystallization within the zones during one stage of the operating cycle or melting of the crystallized material during another stage. Such means are schematically illustrated in FIG. 1 as comprising heat transfer elements 24, 25, 26 and 27 located in the zones and connected, respectively, with coolers 28, 29, 30 and 31 and also, respectively, with heaters 32, 33, 34 and 35 by piping through which streams of a heat transfer medium can be passed in either direction. By this arrangement each zone in the column can be independently heated or cooled to the temperature level desired therein at any particular phase of the operating cycle.

While the heat transfer elements 24, 25, 26 and 27 are illustrated as coils in FIG. 1, any suitable means for providing the necessary heat transfer surfaces can be employed. For example the heat transfer elements can be in the form of tube bundles and the tubes can, if desired, be provided with fins to increase heat transfer area. Rough heat transfer surfaces to which the crystal phase can adhere will help to immobilize the crystals within each zone and in some instances can eliminate the need for filters 19, 20, 21 and 9 between the zones.

The base of column 10 is connected through line 22 with a surge zone to which effluent rich in component A can be passed and from which such effluent can be forced back through line 22 into the column. This is shown in FIG. 1 in the form of a cylinder 36 having a piston 37 slidable therein. The piston can be driven by suitable drive means (not shown) in either direction in the cylinder so as to draw effluent from the base of column 10 into the cylinder or force it back in the opposite direction. A product line 38 containing valve 39 connects with effluent line 22 for removing the high melting product from the system.

An effluent line 23 at the top of the column connects with another product line 40 containing valve 41 through which low melting product can be removed from the system. Optionally a surge tank, indicated by dashed line 42, can be and preferably is connected with effluent line 23 for holding a body of the low melting effluent, in which case line 40 could be a drawoff line from the surge tank. With this arrangement the effluent material can alternately flow through line 23 in each direction between end C of the column and surge tank 42 as piston 37 moves back and forth so as to keep the column filled. However this is not essential for operability of the process and it is permissible for the liquid level to fall below the top of the column during the stage when mother liquor is caused to flow downwardly.

The process as illustrated in FIG. 1 operates in the following cyclic manner. Feed mixture from line 15 is fed into the column into any selected zone removed from end B, that is, other than zone 14. The feed can be introduced continuously or intermittently throughout each cycle or during any one or more stages of the cycle. At one stage a crystallizaion temperature pattern is established throughout the column, gradating from low temperature D at end C to high temperature E at end B, by flowing streams of heat transfer medium through coolers 28, 29, 30 and 31 and through the respective zones in the column. Temperature D is a relatively low temperature at which component A will crystallize from the mixture lean in component A within zone 11. Temperature E is a relatively high temperature at which component A will crystallize from the mixture rich in component A within zone 14. While this crystallization temperature pattern is being maintained, a pulse of mother liquor is caused to flow upwardly in the column by movement of piston 37 from right to left as viewed in FIG. 1. During this stage crystallization of component A in each zone occurs as the richer mother liquor from a lower zone becomes subjected to the lower temperaure in the next zone above it. The crystals formed in each zone are retained therein either by adherence to the heat transfer surfaces or by the filters 9, 19, 20 and 21. Thus the mother liquor becomes progressively leaner in component A as it is forced up the column to effluent line 23. Preferably the lean effluent passes at least in part into surge tank 42.

For the next stage of the cycle a second, higher temperature pattern is established along the series of zones by passing streams of the heat transfer medium through heaters 32, 33, 34 and 35 and through the respective zones in a direction opposite to its previous flow. In this pattern the temperature in each zone is sufficiently high to melt at least a portion of component A crystals formed therein and preferably is high enough to melt all the crystals previously formed or effect dissolution thereof in the adjacent mother liquor. The mother liquor is then caused to flow downwardly in the column via a reciprocal movement of piston 37, and an equivalent amount of liquid effluent rich in component A leaves the bottom of the column through line 22. As this downward flow of mother liquor occurs, an equivalent amount of the low melting product preferably is drawn back into the top of the column from surge tank 42.

Operation of the system in the foregoing manner with continual reversals of direction of flow of materials and correlated variations of temperature patterns results in progressive enrichment of mother liquor with respect to component A toward the bottom of the column and progressive depletion thereof toward the top. Thus high melting product effluent is obtained from the bottom of the column and low melting product effluent from the top. These can be withdrawn from the system respectively through lines 38 and 40 either continuously or intermittently.

In each operating cycle it is preferable although not essential that the amount of effluent forced back from cylinder 36 into the bottom of column 10 be substantially in excess of the amount of feed introduced. In fact a large volume ratio of effluent backflow to feed per cycle, e.g. between 2:1 and 20:1, can be beneficial. It is also desirable that the effluent backflow per cycle be less than the volume capacity of zone 14. In other words the separation tends to improve as both the ratio of backflow to feed and the ratio of capacity of zone 14 to backflow increase.

When the feed material is introduced to the top zone of the column, a relatively large temperature difference will be required between the high and low temperature levels established in that zone, and the corresponding temperature differences needed in lower zones will progressively be less and less toward the bottom. Introduction of the feed into an intermediate zone reduces the high-low temperature differences needed in upper zones and tends to make the required temperature differences more uniform through the column. This is beneficial in that it permits more uniform heat transfer requirements from top to bottom.

FIG. 2 shows a system like that of FIG. 1 except that the heat transfer elements are connected in series. Again column 10 has four fractionating zones 11, 12, 13, 14 with filters at the top of each, and the column is connected at the top with surge tank 42 and at the bottom with cylinder 36 having piston 37. Product drawoff lines 38 and 40 also are the same as in FIG. 1. The heat transfer elements, indicated schematically by numerals 50, 51, 52 and 53, are connected in series through lines containing valves 54, 55 and 56 and heat exchangers 57, 58 and 59. The latter are adapted to function alternately as auxiliary heaters and coolers. Optionally bypass lines containing valves 60, 61 and 62 can be provided so that part of the heat transfer medium flow can be by-passed around the heat exchangers to provide flexibility of control. A storage tank 63 containing a supply of heat transfer medium connects with main cooler 64 which in turn connects through line 65 with the uppermost heat exchange element. At the bottom a cylinder 66 containing piston 67 connects through main heater 68 and line 69 with the lowermost heating element.

For the separation system shown in FIG. 2 the operation of column 10 is essentially as described in conjunction with FIG. 1 and the principle difference is in the heating and cooling system. The crystallization temperature pattern is established by flowing heat exchange medium from tank 63 through main cooler 64 and the series of heat exchange elements into cylinder 66, while utilizing the auxiliary heat exchangers for intermediate adjustment of temperaure levels. For establishing the second temperature pattern to melt the crystals deposited in each zone the heat exchange medium is forced in the opposite direction by piston 67, and heat is supplied to the medium by main heater 68 and the auxiliary heaters as required to reach the desired temperature levels in zones 11, 12, 13 and 14. This heat exchange system provides better efficiency by allowing heat removed from higher temperature zones during a previous cooling stage of the cycle to be utilized for heating lower temperature zones in establishing the second temperature pattern at which melting occurs.

FIG. 3 schematically illustrates another variation of the heat transfer system. Again column 10 is shown with four fractionating zones 11, 12, 13 and 14. The heat transfer system in this instance comprises a single cooler 70 and a single heater 71 respectively positioned adjacent the top and bottom of the column and a continuous heat transfer element 72 extending lengthwise in the column through all four zones. Heat transfer element 72 can be in the form of a coil or a tube bundle, either of which can carry fins to provide increased heat transfer surface. Means such as a cylinder with piston (not shown) are provided for flowing heat transfer medium through element 72 alternately in a downward direction and then in the reverse direction. In operating the process with this arrangement a predetermined crystallization temperature pattern is established by flowing heat transfer fluid downwardly at regulated temperature controlled by operation of cooler 70. Subsequently in the cycle the second temperature pattern for effecting melting is established by flowing heat transfer fluid at regulated temperature in the opposite direction while operating heater 71. This arrangement does not provide the degree of control offered by the arrangement of FIG. 2 but it has the advantage of being simpler and less expensive with respect to apparatus requirements.

The following is a specific example of the invention operated in a system like that of FIG. 1 except that the column has five fractionating zones (numbered 1 at the top to 5 at the bottom) each with a weight capacity for feed material of 100 kg. Mixing occurs in each zone so that the liquid phase is substantially uniform throughout the zone. The feed is a mixture of dimethylnaphthalenes (referred to as "DMN") composed by weight as follows:

40% 2,6-DMN
50% 1,6-DMN
10% 1,5-DMN

Such feed can be obtainable, for example, by producing 1,5-DMN in the manner disclosed in U.S. Pat. No. 3,244,758 of Gert G. Eberhardt, issued Apr. 5, 1966, and then isomerizing same by the procedure described in U.S. Pat. No. 3,109,036 of G. Suld et al., issued Oct. 29, 1963. The objective is to recover in 99% purity from this mixture 2,6-DMN which is the highest melting component (M.P. = 112° C.). The material next crystallizable from the mixture is the eutectic composed of 1,5-DMN and 2,6-DMN in about a 2:1 ratio, its crystallization temperature being of the order of 15–20° C. In each cycle of the operation the following flows of material in the system occur:

feed mixture to No. 1 zone . . . 100 kg.
effluent from No. 5 zone (99% 2,6-DMN) . . . 131.4 kg.
return of effluent to No. 5 zone . . . 100 kg.
2,6-DMN (99%) product removed . . . 31.4 kg.
low melting product removed . . . 68.6 kg.

The following table gives temperature and composition data representative of conditions in the five fractionating zones during the operation.

| Zone No. | 1 | 2 | 3 | 4 | 5 |
|---|---|---|---|---|---|
| Temperatures, ° C: | | | | | |
| For crystallization | 30 | 60 | 90 | 105 | 109 |
| For melting | 78 | 97 | 107 | 110 | 111.5 |
| 2,6-DMN Content of Mother Liquor, wt. %: | | | | | |
| For crystallization | 13 | 30 | 66 | 89 | 95 |
| For melting | 51 | 76 | 92 | 96 | 99 |
| Maximum Solids Hold-up,* wt. % | 56 | 66 | 77 | 82 | 80 |

*Occurs at end of crystallization stage

The tabulated data show that the temperature differences between the crystallization and melting stages of the cycle are relatively large at the cold end of the column and small at the hot end. This is typical for operations in which the feed is introduced to the cold end zone (upper end in this case). When the operation is varied by introducing the feed to an intermediate zone of the column, less variation in this temperature difference from zone to zone is required to achieve the desired separation.

It should be noted that my process achieves purification by crystallization and depends for its effectiveness upon the crystallization temperature gradient across the system. This is to be distinguished from processes such as that disclosed in U.S. Pat. No. 3,305,320 wherein crystallization occurs several times but at the same temperature with a wash liquid being used to effect increased purification of the crystals so formed. Even though the wash liquid may be fed at a plurality of locations and at different temperatures this is still fundamentally a washing procedure to purify the crystals rather than a recrystallization procedure to purify the crystals. In my process a wash liquid is not fed to the crystallization system and in this sense my process consists essentially of steps a–f recited above. Stated in another manner, the only feed to the fractionating system is the multicomponent liquid feed mixture desired to be fractionated.

I claim:

1. A process for separating a preferentially crystallizable dimethylnaphthalene component A from a liquid feed mixture of dimethylnaphthalenes in a fractionating system wherein purification is obtained by crystallization without washing of the crystallized solid, said system having (1) one end B from which component A is removed in liquid phase and another end C from which lower melting component material is removed in liquid phase, (2) a series of crystallization zones between ends B and C. and (3) means for preventing passage of crystallized material between zones, said process consisting essentially of:
   a. feeding said feed mixture into the system at a zone removed from end B;
   b. establishing a crystallization temperature pattern varying from temperature D at end C to temperature E at end B, temperature D being a relatively low temperature at which component A will crystallize from a mixture lean in component A, temperature E being a relatively high temperature at which component A will crystallize from a mixture rich in component A, whereby crystallization of component A from mother liquor occurs in all zones in the series;
   c. flowing mother liquor through the series in a direction from end B to end C while preventing transfer of crystallized material between zones and while maintaining said crystallization temperature pattern, and simultaneously introducing into end B effluent rich in component A previously withdrawn from end B while removing from end C effluent lean in component A;
   d. establishing a second temperature pattern along said series wherein the temperature is sufficiently high to melt in each zone at least a portion of component A crystals previously formed therein;
   e. flowing mother liquor in a direction from end C to end B while maintaining said second temperature pattern, and simultaneously withdrawing from end B effluent rich in component A in amount equivalent to the mother liquor flow;
   f. and separately removing effluents from each end of the fractionating system.

2. Process according to claim 1 wherein said temperature patterns in steps (b) and (d) are established by passing through each zone of said series a heat transfer medium in indirect heat transfer relationship with the feed component material in the zone.

3. Process according to claim 2 wherein the temperature pattern for step (b) is established by cooling a stream of the heat transfer medium and passing same serially through the zones from end C to end B, and wherein the temperature pattern for step (d) is established by heating the transfer medium and passing a reverse stream thereof serially through the zones from end B to end C.

4. Process according to claim 1 wherein during step (e) a portion of said effluent lean in component A is introduced back into end C.

5. Process according to claim 1 wherein said feed mixture is fed into the system at the zone adjacent end C.

6. Process according to claim 1 wherein said feed mixture is fed into the system at a zone intermediate the zones adjacent ends B and C.

7. Process according to claim 6 wherein during step (e) a portion of said effluent lean in component A is introduced back into end C.

8. A separation process for a mixture of dimethylnaphthalenes which effects purification by crystallization without washing of the crystallized solids and which consists essentially of:
   a. introducing a multicomponent liquid feed containing a selectively crystallizable dimethylnaphthalene component into a separation system having a plurality of crystallization zones each of which is permeable to fluid flow therebetween and impermeable to solid flow therebetween;
   b. cooling a first zone to selectively crystallize said component;
   c. flowing the resulting mother liquor to a second zone of lower temperature than the first zone while simultaneously introducing into the first zone liquid rich in the crystallizable component and obtained from the effluent recited in step (g) hereinafter, whereby further crystallization occurs;
   d. withdrawing effluent lean in the crystallizable component from said second zone;
   e. raising the temperatures in said first and second zones to melt at least a portion of the crystals formed therein;
   f. flowing the resulting liquid from said second zone to said first zone;
   g. and withdrawing effluent rich in the crystallizable component from said first zone.

* * * * *